US012693978B2

(12) United States Patent
Li et al.

(10) Patent No.: US 12,693,978 B2
(45) Date of Patent: Jul. 28, 2026

(54) SYSTEMS, METHODS, AND APPARATUS FOR MEMORY LOADING IN A STORAGE DEVICE

(71) Applicant: Samsung Electronics Co., Ltd., Suwon-si (KR)

(72) Inventors: Zongwang Li, Dublin, CA (US); Shuyi Pei, Santa Clara, CA (US); Tong Zhang, Mountain View, CA (US); Rekha Pitchumani, Oak Hill, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/803,749

(22) Filed: Aug. 13, 2024

(65) Prior Publication Data

US 2025/0123968 A1    Apr. 17, 2025

Related U.S. Application Data

(60) Provisional application No. 63/544,438, filed on Oct. 16, 2023.

(51) Int. Cl.
*G06F 12/08* (2016.01)
*G06F 12/0862* (2016.01)

(52) U.S. Cl.
CPC .................................. *G06F 12/0862* (2013.01)

(58) Field of Classification Search
CPC ................................................... G06F 12/0862
USPC ......................................................... 711/137
See application file for complete search history.

(56) References Cited

U.S. PATENT DOCUMENTS

2023/0342299 A1 * 10/2023 Saraf .................... G06F 12/0862
2024/0168885 A1 * 5/2024 Abulila ............... G06F 12/0238

* cited by examiner

*Primary Examiner* — Hua J Song
(74) *Attorney, Agent, or Firm* — Renaissance IP Law Group LLP

(57) ABSTRACT

A device may include memory media; storage media; a buffer; and at least one circuit configured to perform one or more operations including receiving memory address information; storing the memory address information in the buffer; determining that data may be loaded to the memory media; and loading data to the memory media, from the storage media, corresponding to the memory address information in the buffer. In some aspects, the memory address information is first memory address information; the data is first data; and the at least one circuit is further configured to perform one or more operations including receiving a memory access request including second memory address information; determining to load second data based on the memory access request; and loading the second data to the memory media, from the storage media, based on the second memory address information.

20 Claims, 8 Drawing Sheets

SYSTEMS, METHODS, AND APPARATUS FOR MEMORY LOADING IN A STORAGE DEVICE

REFERENCE TO RELATED APPLICATION

This application claims priority to, and the benefit of, U.S. Provisional Patent Application Ser. No. 63/544,438, filed Oct. 16, 2023, which is incorporated by reference.

TECHNICAL FIELD

This disclosure relates generally to storage devices, and more specifically to systems, methods, and apparatus for memory loading in a storage device.

BACKGROUND

A storage device may include memory media (e.g., cache media) and storage media. When a host sends a request for data to the storage device, the storage device may first check the memory media for the data. However, if the data is not found on the memory media, a cache miss may occur and the storage device may search for the data on the storage media.

The above information disclosed in this Background section is only for enhancement of understanding of the background of the inventive principles and therefore it may contain information that does not constitute prior art.

SUMMARY

In some aspects, the techniques described herein relate to a device including memory media; storage media; a buffer; and at least one circuit configured to perform one or more operations including receiving memory address information; storing the memory address information in the buffer; determining that data may be loaded to the memory media; and loading data to the memory media, from the storage media, corresponding to the memory address information in the buffer. In some aspects, the memory address information is first memory address information; the data is first data; and the at least one circuit is further configured to perform one or more operations including receiving a memory access request including second memory address information; determining to load second data based on the memory access request; and loading the second data to the memory media, from the storage media, based on the second memory address information. In some aspects, loading data includes obtaining at least one address from the memory address information; and adding the at least one address to the buffer. In some aspects, the memory address information includes an indication of a length of addresses and at least one address. In some aspects, the memory address information includes at least one address and an indication of a number of addresses. In some aspects, the at least one circuit is further configured to perform one or more operations including receiving an instruction to make the buffer available; and making the buffer available. In some aspects, the at least one circuit is further configured to perform one or more operations including receiving an instruction to make the memory media available; and making the memory media available. In some aspects, the at least one circuit includes a control register configured to perform one or more operations including determining, based on the control register, a status of the buffer; and modifying, based on the status, operations of the at least one circuit.

In some aspects, the techniques described herein relate to a method including receiving memory address information; storing the memory address information in a buffer; determining that data may be loaded to the memory media; and loading data, to memory media, from storage media, based on the memory address information in the buffer. In some aspects, the memory address information is first memory address information; the data is first data; and the method further includes receiving a memory access request including second memory address information; determining to load second data based on the memory access request; and loading the second data, to the memory media, from the storage media, based on the second memory address information. In some aspects, loading data includes obtaining at least one address from the memory address information; and adding the at least one address to the buffer. In some aspects, the memory address information includes an indication of a length of addresses and at least one address. In some aspects, the memory address information includes at least one address and an indication of a number of addresses. In some aspects, the method further includes receiving a request to make the buffer available; and making the buffer available. In some aspects, the method further includes determining a status of the buffer; and modifying, based on the status, operations on the buffer.

In some aspects, the techniques described herein relate to a system including a host device including an application and a thread, wherein the thread includes memory address information for the application; and a storage device including memory media; storage media; a buffer; and at least one circuit configured to perform one or more operations including receiving the memory address information; storing the memory address information in the buffer; determining that data may be loaded to the memory media; and loading data, to the memory media, from the storage media, based on the memory address information in the buffer. In some aspects, the at least one circuit is further configured to perform one or more operations including receiving a memory access request including second memory address information; determining to load second data based on the memory access request; and loading the second data, to the memory media, from the storage media, based on the second memory address information. In some aspects, the memory address information includes an indication of a length of addresses and at least one address. In some aspects, the memory address information includes at least one address and an indication of a number of addresses. In some aspects, the at least one circuit is further configured to perform one or more operations including receiving an instruction to make the buffer available; and making the buffer available.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
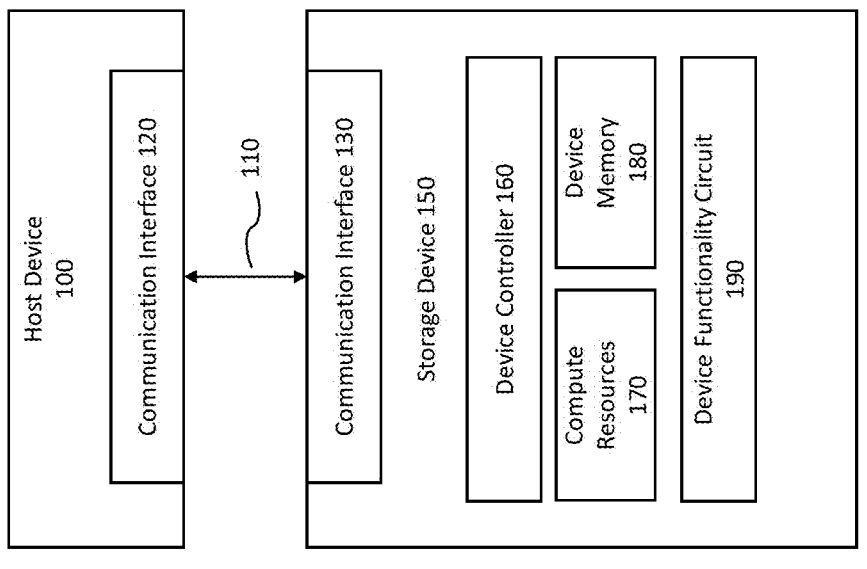
FIG. 1 illustrates an embodiment of a storage device scheme in accordance with example embodiments of the disclosure.

Memory media (e.g., cache media) may be used to improve the overall performance of a storage device. For example, a storage device can populate data in memory media to respond to future requests for that data faster than if the data was only located in storage media. If a host requests data that is in the memory media (e.g., a cache hit), then the data can be retrieved from the memory media. If data is not found in the memory media (e.g., a cache miss), the data may be retrieved from the storage media. In some embodiments, as more cache hits occur, performance may improve since data may be retrieved from the memory media. Generally, memory media may include memory (e.g., dynamic random-access memory (DRAM)) that allows for faster read and writes compared to storage media such as a not-AND (NAND) flash device. A storage device in accordance with example embodiments of the disclosure may include memory media (e.g., DRAM) and storage media (e.g., NAND flash device).

In some embodiments, the performance of a storage device may benefit through parallelism, e.g., processing multiple commands at the same time. For example, while a NAND flash device is being accessed (e.g., load/store requests), other commands may be processed at the same time, thus, mitigating some of the latency associated with NAND-based media. In some embodiments, it may be beneficial for the input/output (I/O)) queue of the storage device to be kept full and/or near capacity. For example, by keeping the I/O queue full, commands may be received for the storage device to process so that the storage device may not wait to receive additional commands. However, the ability to process multiple commands from the I/O queue may be underutilized because the queue may not have the capacity to handle many load/store requests.

Furthermore, the access patterns to the storage device may be random resulting in a low cache hit rate when the memory media is not populated efficiently. When a cache miss happens, the data may be loaded from the storage media to the memory media, which can lead to longer latency than retrieving data from the memory media. In some embodiments, a way to mitigate the latency may be to have multiple processes on the application side that can read data simultaneously. However, the number of processes may be limited by computational resources (e.g., central processing unit (CPU) cores), leading to insufficient I/O to the storage device. In some embodiments, dedicating more processes for data loading may result in insufficient compute processes, which in turn, can degrade the overall performance (e.g., fewer compute processes may reduce the number of queries per second ("QPS")). In addition, scaling the number of processes may not improve performance to outweigh the cost of adding additional computational resources to the device. Thus, in some embodiments, to increase the cache hit rate, an in-device hardware prefetcher may be introduced to the storage device.

In some embodiments, in-device hardware prefetching may improve the cache hit rate so that the input/output operations per second (IOPS) increases while also decreasing latency of the storage device. Thus, in some embodiments, multiple threads for loading data may not be added, which may result in lowered CPU resource consumption as compared with a device that does not perform in-device hardware prefetching.

According to embodiments of the disclosure, a storage device may include a prefetcher. In some embodiments, the storage device may retrieve address information from a host for use in an application. In some embodiments, the storage device may store the address information in the prefetcher, and retrieve the address information from the prefetcher to populate the cache on the storage device.

This disclosure encompasses numerous aspects relating to devices with memory and storage configurations. The aspects disclosed herein may have independent utility and may be embodied individually, and not every embodiment may utilize every aspect. Moreover, the aspects may also be embodied in various combinations, some of which may amplify some benefits of the individual aspects in a synergistic manner.

For purposes of illustration, some embodiments may be described in the context of some specific implementation details such as devices implemented as storage devices that may use specific interfaces, protocols, and/or the like. However, the aspects of the disclosure are not limited to these or any other implementation details.

FIG. 1 illustrates an embodiment of a storage device scheme in accordance with example embodiments of the disclosure. The embodiment illustrated in FIG. 1 may include one or more host devices 100 and one or more storage devices 150 configured to communicate using one or more communication connections 110.

In some embodiments, a host device 100 may be implemented with any component or combination of components that may utilize one or more features of a storage device 150. For example, a host may be implemented with one or more of a server, a storage node, a compute node, a central processing unit (CPU), a workstation, a personal computer, a tablet computer, a smartphone, and/or the like, or multiples and/or combinations thereof.

In some embodiments, a storage device 150 may include a communication interface 130, memory 180 (some or all of which may be referred to as device memory), one or more compute resources 170 (which may also be referred to as computational resources), a device controller 160, and/or a device functionality circuit 190. In some embodiments, the device controller 160 may control the overall operation of the storage device 150 including any of the operations, features, and/or the like, described herein. For example, in some embodiments, the device controller 160 may parse, process, invoke, and/or the like, commands received from the host devices 100.

In some embodiments, the device functionality circuit 190 may include any hardware to implement the primary function of the storage device 150. For example, the device functionality circuit 190 may include storage media such as magnetic media (e.g., if the storage device 150 is implemented as a hard disk drive (HDD) or a tape drive), solid state media (e.g., one or more flash memory devices), optical media, and/or the like. For instance, in some embodiments, a storage device may be implemented at least partially as a solid-state drive (SSD) based on NAND flash memory, persistent memory (PMEM) such as cross-gridded nonvolatile memory, memory with bulk resistance change, phase change memory (PCM), or any combination thereof. In some embodiments, the device controller 160 may include a media translation layer such as a flash translation layer (FTL) for interfacing with one or more flash memory devices. In some embodiments, the storage device 150 may be implemented as a computational storage drive, a computational storage processor (CSP), and/or a computational storage array (CSA).

As another example, if the storage device 150 is implemented as an accelerator, the device functionality circuit 190 may include one or more accelerator circuits, memory circuits, and/or the like.

The compute resources 170 may be implemented with any component or combination of components that may perform operations on data that may be received, stored, and/or generated at the storage device 150. Examples of compute engines may include combinational logic, sequential logic, timers, counters, registers, state machines, complex programmable logic devices (CPLDs), field programmable gate arrays (FPGAs), application specific integrated circuits (ASICs), embedded processors, microcontrollers, central processing units (CPUs) such as complex instruction set computer (CISC) processors (e.g., x86 processors) and/or a reduced instruction set computer (RISC) processors such as ARM processors, graphics processing units (GPUs), data processing units (DPUs), neural processing units (NPUs), tensor processing units (TPUs), and/or the like, that may execute instructions stored in any type of memory and/or implement any type of execution environment such as a container, a virtual machine, an operating system such as Linux, an Extended Berkeley Packet Filter (eBPF) environment, and/or the like, or a combination thereof.

In some embodiments, the memory 180 may be used, for example, by one or more of the compute resources 170 to store input data, output data (e.g., computation results), intermediate data, transitional data, and/or the like. The memory 180 may be implemented, for example, with volatile memory such as DRAM, static random-access memory (SRAM), and/or the like, as well as any other type of memory such as nonvolatile memory.

In some embodiments, the memory 180 and/or compute resources 170 may include software, instructions, programs, code, and/or the like, that may be performed, executed, and/or the like, using one or more compute resources (e.g., hardware (HW) resources). Examples may include software implemented in any language such as assembly language, C, C++, and/or the like, binary code, FPGA code, one or more operating systems, kernels, environments such as eBPF and/or the like. Software, instructions, programs, code, and/or the like, may be stored, for example, in a repository in memory 180 and/or compute resources 170. In some embodiments, software, instructions, programs, code, and/or the like, may be downloaded, uploaded, sideloaded, pre-installed, built-in, and/or the like, to the memory 180 and/or compute resources 170. In some embodiments, the storage device 150 may receive one or more instructions, commands, and/or the like, to select, enable, activate, execute, and/or the like, software, instructions, programs, code, and/or the like. Examples of computational operations, functions, and/or the like, that may be implemented by the memory 180, compute resources 170, software, instructions, programs, code, and/or the like, may include any type of algorithm, data movement, data management, data selection, filtering, encryption and/or decryption, compression and/or decompression, checksum calculation, hash value calculation, cyclic redundancy check (CRC), weight calculations, activation function calculations, training, inference, classification, regression, and/or the like, for artificial intelligence (AI), machine learning (ML), neural networks, and/or the like.

In some embodiments, a communication interface 120 at a host device 100, a communication interface 130 at a storage device 150, and/or a communication connection 110 may implement, and/or be implemented with, one or more interconnects, one or more networks, a network of networks (e.g., the internet), and/or the like, or a combination thereof, using any type of interface, protocol, and/or the like. For example, the communication connection 110, and/or one or more of the interfaces 120 and/or 130 may implement, and/or be implemented with, any type of wired and/or wireless communication medium, interface, network, interconnect, protocol, and/or the like including Peripheral Component Interconnect Express (PCIe), NVMe, NVMe over Fabric (NVMe-oF), Compute Express Link (CXL), and/or a coherent protocol such as CXL.mem, CXL.cache, CXL.io and/or the like, Gen-Z, Open Coherent Accelerator Processor Interface (OpenCAPI), Cache Coherent Interconnect for Accelerators (CCIX), and/or the like. Advanced extensible Interface (AXI), Direct Memory Access (DMA), Remote DMA (RDMA), RDMA over Converged Ethernet (ROCE), Advanced Message Queuing Protocol (AMQP), Ethernet, Transmission Control Protocol/Internet Protocol (TCP/IP), FibreChannel, InfiniBand, Serial ATA (SATA), Small Computer Systems Interface (SCSI), Serial Attached SCSI (SAS), iWARP, any generation of wireless network including 2G, 3G, 4G, 5G, 6G, and/or the like, any generation of Wi-Fi, Bluetooth, near-field communication (NFC), and/or the like, or any combination thereof. In some embodiments, a communication connection 110 may include one or more switches, hubs, nodes, routers, and/or the like.

In some embodiments, a storage device 150 may be implemented in any physical form factor. Examples of form factors may include a 3.5 inch, 2.5 inch, 1.8 inch, and/or the like, storage device (e.g., storage drive) form factor, M.2 device form factor, Enterprise and Data Center Standard Form Factor (EDSFF) (which may include, for example, E1.S, E1.L, E3.S, E3.L, E3.S 2T, E3.L. 2T, and/or the like), add-in card (AIC) (e.g., a PCIe card (e.g., PCIe expansion card) form factor including half-height (HH), half-length (HL), half-height, half-length (HHHL), and/or the like), Next-generation Small Form Factor (NGSFF), NF1 form factor, compact flash (CF) form factor, secure digital (SD) card form factor, Personal Computer Memory Card International Association (PCMCIA) device form factor, and/or the like, or a combination thereof. Any of the computational devices disclosed herein may be connected to a system using one or more connectors such as SATA connectors, SCSI connectors, SAS connectors, M.2 connectors, EDSFF connectors (e.g., 1 C, 2 C, 4 C, 4 C+, and/or the like), U.2 connectors (which may also be referred to as SSD form factor (SSF) SFF-8639 connectors), U.3 connectors, PCIe connectors (e.g., card edge connectors), and/or the like.

Any of the storage devices disclosed herein may be used in connection with one or more personal computers, smart phones, tablet computers, servers, server chassis, server racks, datarooms, datacenters, edge datacenters, mobile edge datacenters, and/or any combinations thereof.

In some embodiments, a storage device 150 may be implemented with any device that may include, or have access to, memory, storage media, and/or the like, to store data that may be processed by one or more compute resources 170. Examples may include memory expansion and/or buffer devices such as CXL type 2 and/or CXL type 3 devices, as well as CXL type 1 devices that may include memory, storage media, and/or the like.

Figure 2:
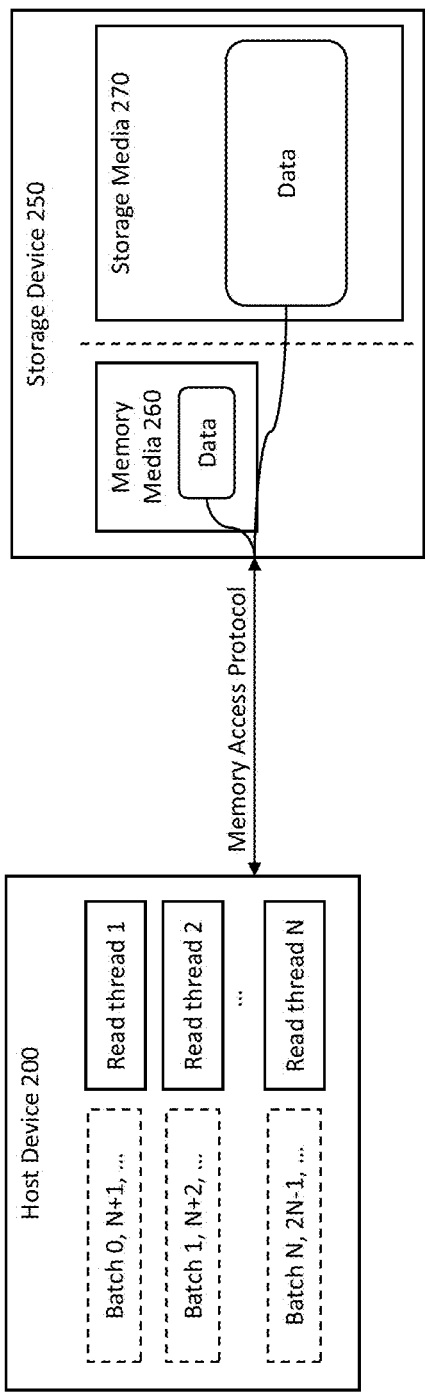
FIG. 2 illustrates an embodiment of a storage device in accordance with example embodiments of the disclosure.

FIG. 2 illustrates an embodiment of a storage device in accordance with example embodiments of the disclosure. FIG. 2 illustrates a host device 200 and a storage device 250. The storage device 250 may include memory media 260 and storage media 270. In some embodiments, the host device 200 may execute an application that may generate multiple read threads for data (e.g., read thread 1, read thread 2, . . . read thread N). In some embodiments, the host device 200 may communicate with the storage device 250 using a memory access protocol (e.g., CXL.mem protocol). In some embodiments, the host device 200 may request data from the storage device 250. In some embodiments, the host device 200 may not know where the data is located on the storage device, and the storage device may return data from the memory media 260 if the data is located in the memory media (e.g., cache hit), or return the data from the storage media 270 if the data is not found on the memory media 260. In some embodiments, the memory media 260 may be DRAM. In some embodiments, the storage media may be NAND. In some embodiments, retrieving data from the memory media 260 may be faster than retrieving data from the storage media, and thus, prefetching data from the storage media 270 to the memory media 260 to increase the number of cache hits may be desired.

Figure 3:
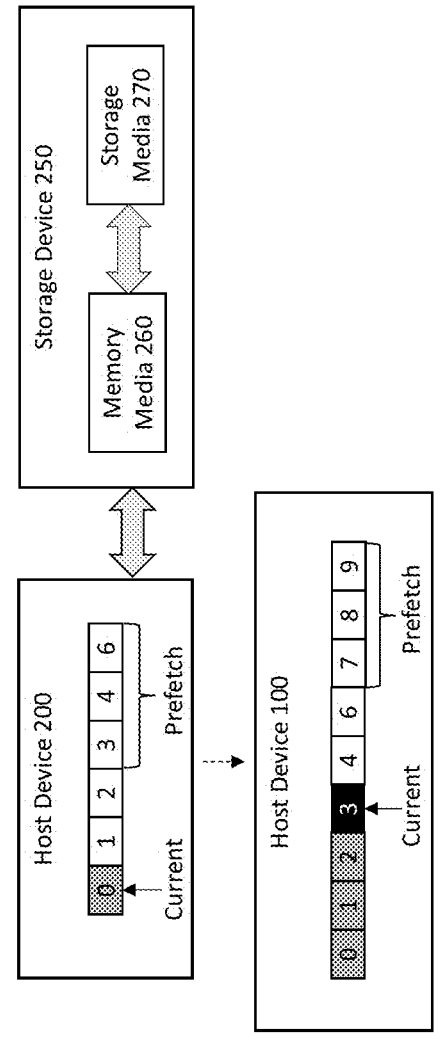
FIG. 3 illustrates an example of a prefetch process in accordance with example embodiments of the disclosure.

FIG. 3 illustrates an example of a prefetch process in accordance with example embodiments of the disclosure. The embodiment illustrated in FIG. 3 may be used to implement, and/or may be implemented with, for example, the device illustrated in FIG. 2 in which similar elements may be indicated by reference numbers ending in, and/or containing, the same digits, letters, and/or the like.

In some embodiments, the host device 200 may request that the storage device 250 prefetch data from the storage media 270 to the memory media 260 using a memory access protocol (e.g., CXL.mem). For example, the CXL.mem protocol may allow the host to send an address to be fetched from the memory media 260. However, due to the latency of loading the data from the storage media 270 to the memory media 260, the data may be accessed by the host device before the prefetch can finish. In FIG. 1, the host device 200 (as shown in the upper left-hand box) illustrates a current position at block 0 and prefetch request of blocks 3, 4, 6. In other words, the host device 200 may be accessing the memory at block 0 while also requesting that the memory media 260 be populated with blocks 3, 4, and 6. However, in some embodiments, due to the latency associated with moving data from the storage media, when the host attempts to access block 3 (as shown in the lower left-hand box), it may not yet be populated in the memory media 260. Thus, the storage device may handle the request from storage media 270 instead of the memory media 260, leading to increased latency due to the slower speed of the storage media 270.

Figure 4:
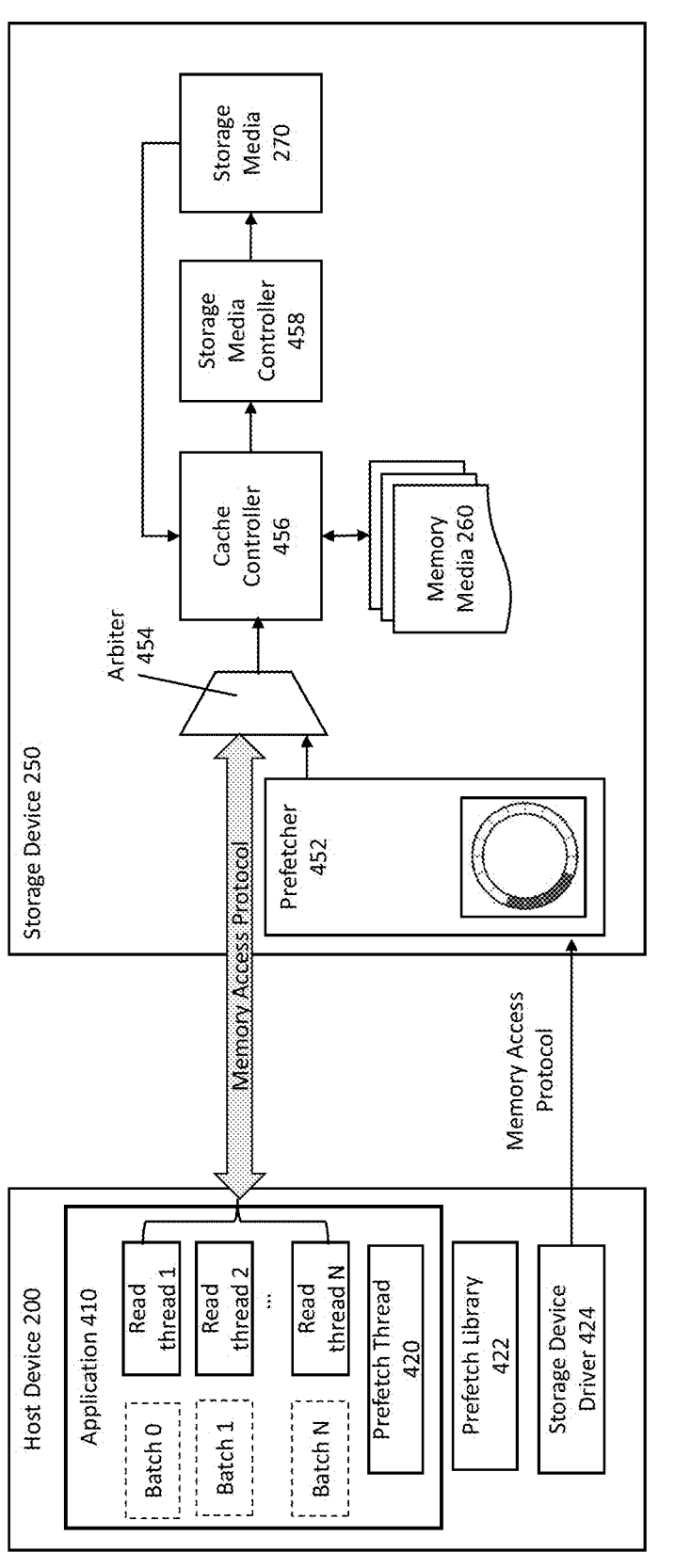
FIG. 4 illustrates an embodiment of another storage device in accordance with example embodiments of the disclosure.

FIG. 4 illustrates an embodiment of a storage device in accordance with example embodiments of the disclosure. The embodiment illustrated in FIG. 4 may be used to implement, and/or may be implemented with, for example, the device illustrated in FIG. 2 in which similar elements may be indicated by reference numbers ending in, and/or containing, the same digits, letters, and/or the like. In some embodiments, the storage device 250 may be configured to use and/or be compatible with various aspects of a memory access protocol such as CXL. In some embodiments, the memory media 260 may be configured as a cache and the storage media 270 may be configured to store data. For example, the storage media 270 may store persistent data, and at least a part of the data may be written to the memory media 260.

In this example, the memory media 260 may be a DRAM device cache and the storage media 270 may be NAND-based media, e.g., NVMe storage device. However, in other embodiments, the memory media 260 may be implemented with other types of memory media (e.g., volatile media that may have relatively high access speeds and low latency). In still other embodiments, the storage media 270 may be implemented with other types of storage media (e.g., non-volatile media that may have relatively high capacity and/or relatively low cost).

In some embodiments, the host device 200 may include an application 410 and a prefetch thread 420. In some embodiments, the prefetch thread 420 may be part of the application 410, whereas in other embodiments, the prefetch thread 420 may be a separate component of the host device 200. In some embodiments, the application 410 may generate multiple read threads for data (e.g., read thread 1, read thread 2, . . . read thread N). In some embodiments, the host device 200 may pass read requests corresponding to the read thread to the storage device 250 using a memory access protocol (e.g., CXL.mem). In some embodiments, the prefetch thread 420 may determine what data will be used by the application 410 and pass the information for the data (e.g., memory address information) to the prefetcher 452. In some embodiments, the host device 200 may pass the memory address information to the prefetcher 452 using the prefetch library 422 and storage device driver 424 using a memory access protocol (e.g., CXL.IO). In some embodiments, the memory access protocol for the read requests and the memory access protocol for the prefetcher may be different protocols.

In some embodiments, the storage device 250 may further include at least one circuit (e.g., cache controller 456 and storage media controller 458). In some embodiments, the cache controller 456 may be used to manage the memory media 260. For example, the cache controller 456 may be used to copy data to the memory media 260, e.g., retrieve data from the storage media 270 to populate the memory media 260. In some embodiments, the cache controller 456 may communicate with the storage media controller 458 to retrieve the data from the storage media 270. In some embodiments, the storage media controller 458 may be used to handle read and write operations to the storage media 270. For example, if data is not found in the memory media 260 (e.g., cache miss), the cache controller 456 may issue a read request to the storage media controller 458 (e.g., NAND read request), and the storage media controller 458 may read the data from the storage media 270. In some embodiments, a read request may be an I/O request using a memory access protocol. In some embodiments, the cache controller 456 may receive the data from the storage media 270 and write it to the memory media 260 (e.g., DRAM cache write request). Additional examples of operations of the cache controller 456 may include implementing one or more cache mappings, data writing policies (e.g., write-through, write-back, and/or the like), cache replacement policies, and/or the like. In some embodiments, the storage media controller 458 may be a NAND controller (e.g. a NAND channel controller) that may control NAND flash that may be used to implement the storage media 270.

In some embodiments, the storage device 250 may include at least one circuit (e.g., prefetcher 452 and arbiter 454). In some embodiments, the prefetcher 452 may receive memory address information from a host. For example, the memory address information may be addresses of data or a range of addresses of data for use by an application. In some embodiments, the memory address information may be used for copying data from the storage media 270 to the memory media 260. In some embodiments, the prefetcher 452 may store the address information in a buffer (e.g., prefetch queue) and retrieve (e.g., dequeue) the memory address information from the buffer to request data from the memory media 260. In some embodiments, if the data is not found in the memory media 260, the data may be copied from the storage media 270 to the memory media 260. In some embodiments, the arbiter 454 may decide an order in which requests are handled. For example, if an I/O request from a host is received, the arbiter 454 may decide whether to handle the I/O request or a request (e.g., address) from the prefetcher 452. Although, in FIG. 4, the prefetcher 452 is included in the storage device 250, the prefetcher may also be part of a host or a second device, where the host or second device may send the address information used to populate the memory media 260. In addition, the prefetcher 452 may be implemented as hardware, software, or at least in part in software and hardware. Furthermore, although the prefetcher 452 receives address information from a host in FIG. 4, the address information may come from any other source that may consider the address information for the host. For example, the address information may be determined by usage patterns of the application, from historical data, or may be determined using AI. Any source of address information may be considered within the scope of the disclosure.

In some embodiments, to obtain addresses from the memory address information, the prefetcher 452 may parse addresses from the memory address information. For example, the memory address information may include an indication of a length of addresses (e.g., number of addresses) and at least one address. In some embodiments, if the memory address information includes at least one address, the at least one address may be parsed by the prefetcher 452 to the prefetch queue. In some embodiments, the memory address information may alternatively include at least one address and an indication of a range of addresses. For example, some applications may process data in batches. Thus, by prefetching a range of addresses, the data may be loaded to the cache. In some embodiments, if the memory address information is a range of addresses, the prefetcher 452 may determine a start address from the memory address information and may add addresses starting from the start address to the prefetch queue.

In some embodiments, the prefetcher 452 may be any hardware implementation suitable for receiving addresses and passing addresses to the cache controller 456. For example, the prefetcher 452 may be a Field-Programmable Gate Array (FPGA) implementation. The prefetcher 452 may also be implemented on an Application-Specific Integrated Circuit (ASIC), System on a Chips (SoC), or any other appropriate hardware architecture.

In some embodiments, a load balancing scheme may be used by the arbiter 454 to determine the order in which requests are handled. In some embodiments, a load balancing scheme may allow the storage device to fairly handle requests from a host and the prefetcher so that both requests from the host and the prefetcher can be handled effectively. Any load balancing scheme may be used by the arbiter 454 to determine the order in which requests are handled. For example, the arbiter 454 may use a weighted round robin for the load balancing scheme. In some embodiments, the requests from the host and the requests from the prefetcher can be given weights, and the arbiter 454 can use the weights to determine which requests to process in order. It is within the scope of this disclosure to use any appropriate load balancing scheme for the arbiter 454.

In some embodiments, for a CXL-compatible storage device, the I/O request from the host may include a CXL.mem request and the prefetch request from the host may be a CXL.io request. Generally, an I/O request (e.g., load/store) allows a host to access the storage device. However, the host may not be able to directly access the cache using an I/O request. Instead, the host can make a request for data, which may be handled by the cache and/or storage media. However, by using a protocol such as CXL.io, the host can directly access the cache (e.g., access data using address information). In some embodiments, when an address is not found on the cache, e.g., a cache miss occurs, the data may be copied from the storage media 270 to the memory media 260.

In this example, the storage device 250 may implement one or more memory access protocols but in other embodiments may implement, or be implemented with, any other interfaces, protocols, and/or the like that may enable a user to access data as memory (e.g., DDR, OMI, Gen-Z, DMA, RDMA, and/or the like). The CXL (or other) protocol(s) may operate with any underlying transport scheme (e.g., physical layer, transport layer, and/or the like) including, for example, PCIe, Ethernet, InfiniBand, and/or the like.

In some embodiments, the prefetcher 452 may have its own prefetch queue for holding addresses for prefetching. In some embodiments, the prefetch queue may be a cyclic data buffer.

In some embodiments, additional commands may be supported by the prefetcher 452. For example, a make buffer available or clear command (e.g., a command to clear the buffer), make cache available or invalidate command (e.g., invalidate or clear data in the cache), and query command (e.g., query the cyclic data buffer status) may also be provided. In some embodiments, if the storage device 250 receives a make buffer available or clear command, the prefetcher 452 may make available (e.g., clear) the prefetch queue.

In some embodiments, the cache controller 456 may include an instruction to make available (e.g., clear) data in the memory media 260 (e.g., invalidate command) and make the memory media 260 available (e.g., clear data in the memory media). For example, if data in the memory media 260 is no longer being used, the memory media 260 can be made available (e.g., cleared), freeing up memory in the memory media 260 to be written. Thus, the cache controller 456 can write data to the memory media 260 when the memory media 260 is available (e.g., the data was cleared).

In some embodiments, the storage device 250 may include a prefetcher control register. In some embodiments, the prefetcher control register may be used to determine whether the queue is full. In some embodiments, if the queue is full, the prefetcher 452 may wait to load additional memory address information to the prefetch queue. This prevents existing memory address information in the prefetch queue from getting overwritten and/or causing an error in the system from attempting to write memory address information to the prefetch queue. In some embodiments, if the queue is not full, the memory address information may be written to the prefetch queue. In some embodiments, the prefetch control register may be updated whenever memory address information is written to the prefetch queue or sent to the cache controller 456.

Figure 5:
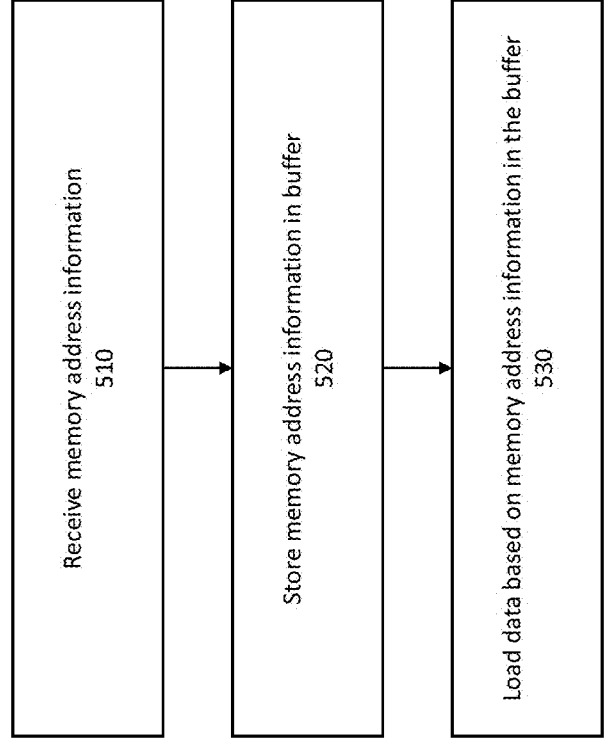
FIG. 5 illustrates a method for using a prefetcher to load data to a buffer of the storage device in accordance with example embodiments of the disclosure.

FIG. 5 illustrates an example of a method for using a prefetcher to load data to a buffer of a storage device in accordance with example embodiments of the disclosure.

At 510, the prefetcher may receive memory address information. For example, a host may send a request to prefetch data to the prefetcher. In some embodiments, the memory address information may include an indication of a length of addresses (e.g., the number of addresses in the request), and one or more memory addresses. In some embodiments, the address information may alternatively include a first address and an indication of a number of addresses (e.g., range of addresses).

At 520, the prefetcher may store the memory address information in a buffer. For example, if the memory address information includes one or more addresses, the addresses may be parsed by the prefetcher to the buffer. In some embodiments, if the memory address information is a range of addresses, the prefetcher may determine a start address (and subsequent addresses) from the memory address information. In some embodiments, the prefetcher may add the one or more addresses to the buffer.

At 530, data may be loaded to memory media based on the address information in the buffer. For example, the prefetcher may retrieve addresses from the buffer. In some embodiments, the addresses in the prefetch queue may be used to seek/load data to the memory media, as described above with regard to FIG. 3. In some embodiments, an arbiter may receive the addresses from the queue and determine whether to process the address from the prefetch queue or another I/O request, e.g., from a host. In some embodiments, if the arbiter chooses the address from the prefetch queue, the storage device may look for the data in the memory media. If it cannot find the data in the memory media, the data may be copied from the storage media to the memory media. In some embodiments, the host may know that the above steps are being performed, e.g., no indicator may be returned to the host to indicate that the data has been loaded to the memory media. Thus, the prefetch operation may be transparent to the host, and the host may receive data from the memory media.

In some embodiments, if the data is no longer needed or other data is needed, the prefetch queue may be made available (e.g., cleared), allowing for new memory address information to be loaded to the prefetch queue.

Figure 6:
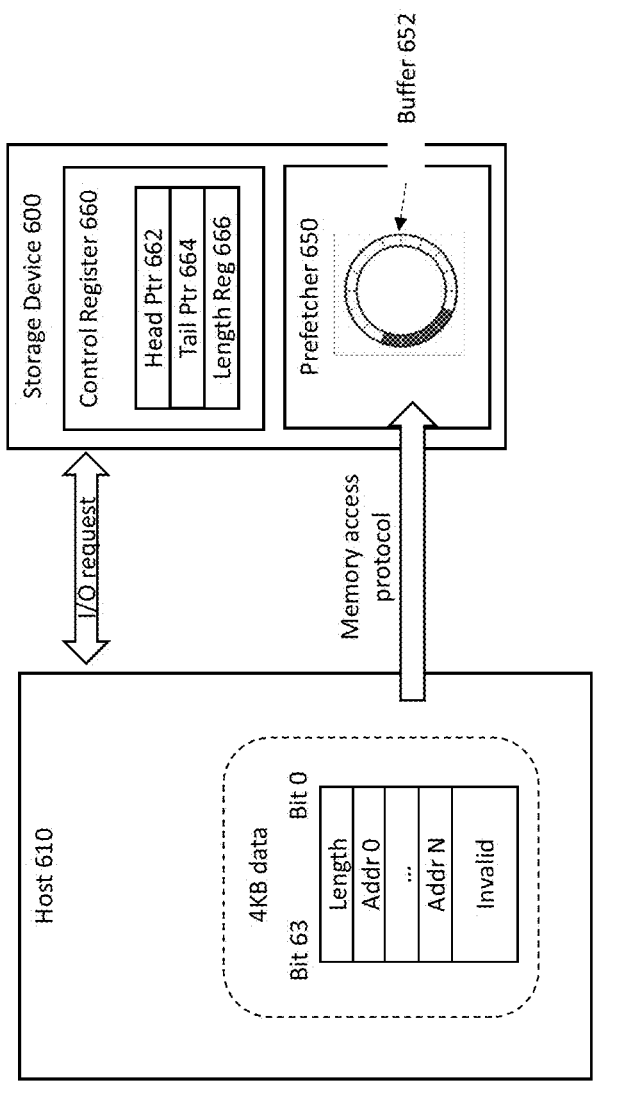
FIG. 6 illustrates an example operating environment for using a prefetcher to load data to a buffer of the storage device in accordance with example embodiments of the disclosure.

FIG. 6 illustrates an example operating environment for using a prefetcher to load data to a buffer of a storage device in accordance with example embodiments of the disclosure. The embodiment illustrated in FIG. 6 may be used to implement, and/or may be implemented with, for example, the device illustrated in FIG. 2 in which similar elements may be indicated by reference numbers ending in, and/or containing, the same digits, letters, and/or the like.

In some embodiments, a host 610 (e.g., using a background prefetch thread) may send a prefetch request to a storage device 600. For example, the host 610 may send the number of addresses (e.g., an indication of a length of addresses in the request) and one or more addresses to the storage device 600. In some embodiments, the host 610 may send a first address and an indication of a number of addresses (e.g., range of addresses) to the storage device 600. In some embodiments, the host 610 may send the prefetch request including the addresses of the data to be prefetched to the device using a cache coherent protocol. In some embodiments, the host 610 may know what addresses to prefetch from the storage device 600. In particular, for some applications, the data may be stored to the storage device 600 in such a way that the application and/or host may know how to load the data as well. In other words, the address information may be predicted by the application and/or host. For example, a prefetcher can be used with applications with multiple threads for load/store operations and applications that know the data access pattern, e.g., for machine learning (ML) applications such as a deep learning recommendation model (DLRM) that process data in batch, or bioinformatics. In some embodiment, AI, e.g., ML models, may be used to determine addresses for the prefetch thread.

In some embodiments, an application programming interface (API) may be provided to prefetch data. For example, the host may use a cache coherent protocol command to prefetch data. In some embodiments, the command to prefetch data may not be limited to any specific sizes. For purposes of illustrating some aspects of the disclosure, however, in one example embodiment, the request may be 4 kilobytes (KB). In some embodiments, a load/store request, on the other hand, may be a different size, e.g., 64 bytes. Thus, more addresses to be prefetch may be included in a prefetch request as opposed to a load/store request.

In some embodiments, the storage device 600 may include a prefetcher 650, and the prefetcher 650 may include a buffer 652 (e.g., cyclic data buffer). In some embodiments, addresses may be parsed from the prefetch request and added to the buffer 652. In some embodiments, as new addresses are read in, the addresses may be added to the end of the buffer 652. In some embodiments, the storage device 600 may include a control register 660. In some embodiments, the control register 660 may include a head pointer 662 indicating a starting position (e.g., first address) of the buffer 652, a tail pointer 664 indicating an end position (e.g., last address) of the buffer 652, and a length of the register 666 indicating the number of entries in the register. In some embodiments, control options (e.g., clear) of the prefetcher may be implemented by Memory-mapped I/O ("MMIO"). Thus, the host may send an I/O request to clear the buffer 652, which when received, may clear the addresses in the buffer 652. In some embodiments, the data for the next few batches can be prefetched when the current batch is being processed. In some embodiments, the buffer 652 may be large (e.g., 32 k entries) to hold the addresses to be prefetched. In some embodiments, the control register 660 may be implemented in a FPGA, and the buffer 652 may be implemented in SRAM or DRAM.

In some embodiments, other commands may also be supported. For example, a prefetch status request may allow the host to query the status of the prefetcher. In some embodiments, if the prefetch status request indicates that the buffer 652 is full, the host may wait to send prefetch requests.

Figure 7B:
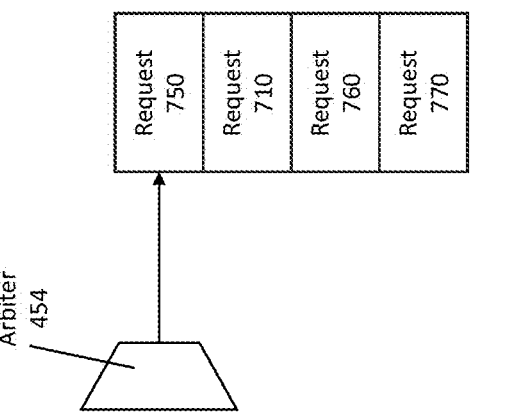
FIG. 7*b* illustrate another example of determining an order to handle requests in accordance with example embodiments of the disclosure.
Figure 7A:
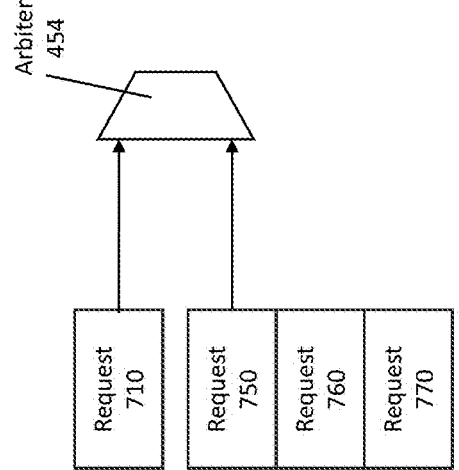
FIG. 7*a* illustrate an example of determining an order to handle requests in accordance with example embodiments of the disclosure.

FIGS. 7a and 7b illustrate an example of determining an order to handle requests in accordance with example embodiments of the disclosure. The embodiment illustrated in FIGS. 7a and 7b may be used to implement, and/or may be implemented with, for example, the device illustrated in FIG. 4 in which similar elements may be indicated by reference numbers ending in, and/or containing, the same digits, letters, and/or the like. In some embodiments, request 710 may be an I/O request from a host. In some embodiments, request 750, request 760, and request 770 may be addresses on the prefetch queue. In some embodiments, an arbiter 454 may select a request to process using any load balancing scheme. In this example, the arbiter 454 may handle the request 750 from the prefetch queue first. In some embodiments, the arbiter 454 may handle the request 710 from the I/O request. In some embodiments, the arbiter 454 may handle the request 760 and request 770 from the prefetch queue. Thus, an arbiter can load memory to a memory media allowing for the IOPS to be maximized.

Figure 8:
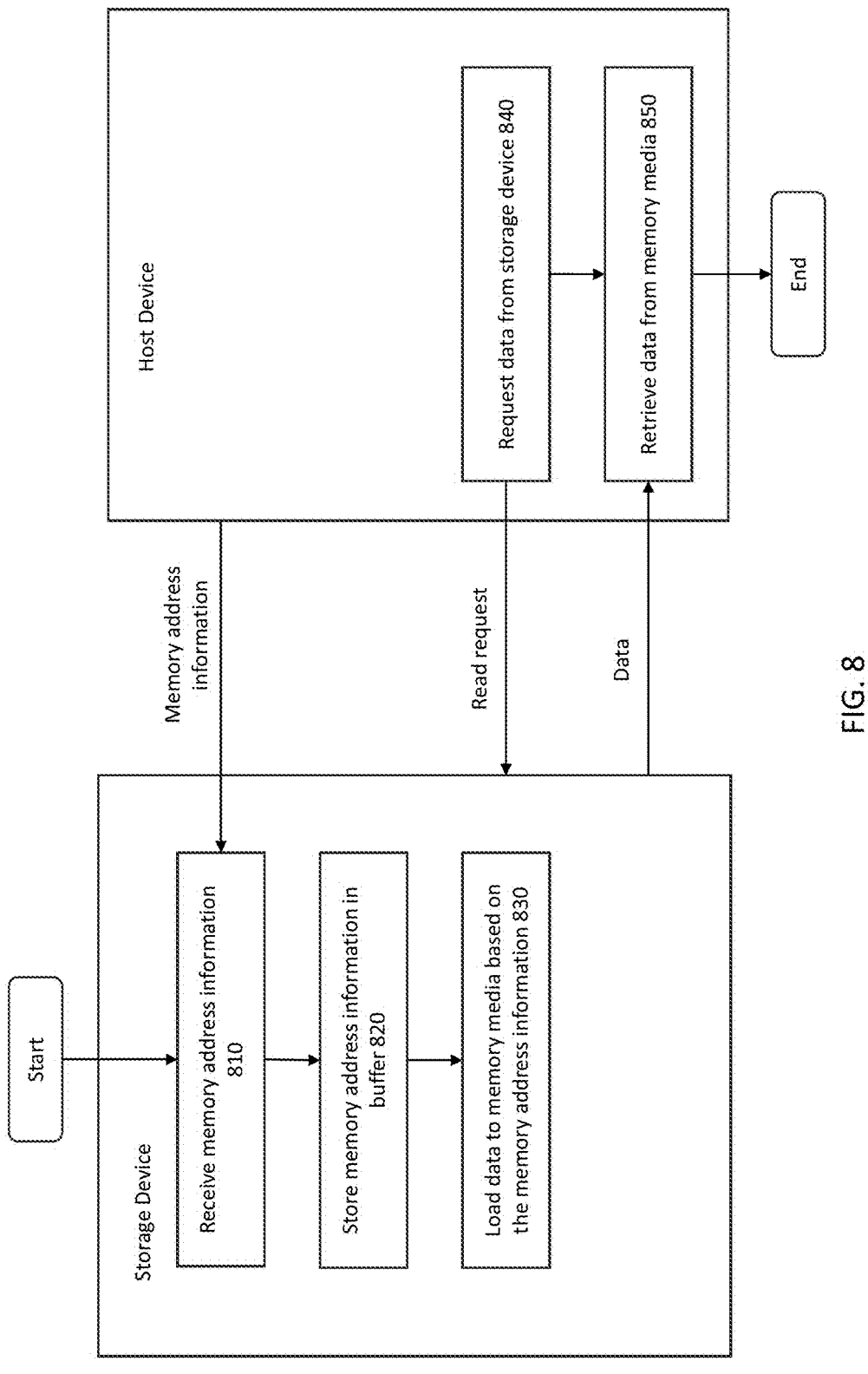
FIG. 8 illustrates a flowchart of prefetching data in accordance with example embodiments of the disclosure.

FIG. 8 illustrates a flowchart of prefetching data in accordance with example embodiments of the disclosure. For example, at block 810, according to embodiments, a storage device may receive memory address information. For example, the storage device may receive prefetch memory address information from a host device. In some embodiments, the memory address information may be information related to application data used by the host. In some embodiments, the host may send other information that the storage device may use to determine addresses of data to be loaded to the cache on the storage device. In some embodiments, the address information may correspond to data that may be used, using any logic, to determine the next data. In some embodiments, the address information may contain one or more addresses. In some embodiments, the address information may be indications of addresses, which the storage device may translate to addresses on the storage device. In some embodiments, the storage device may use a table to translate the address information on the storage device. In some embodiments, the data used to determine addresses on the storage device can be sent by a host, an internal process, or the storage device itself.

At block 820, according to embodiments, the storage device may store the address information in a buffer (e.g., prefetcher queue). In some embodiments, a prefetcher may include a buffer. In some embodiments, the prefetcher may receive that address information from a host and populate the buffer using the address information. In some embodiments, the buffer may be a ring buffer or some other queue to store the address information. In some embodiments, the storage device may load the addresses that are to be retrieved from the storage device. In some embodiments, the buffer can include the message from the host in the storage device. In some embodiments, the buffer can receive an indication of an address, which may be used to determine a real address. Although a first-out (FIFO) queue is described, in some embodiments, the prefetcher may be an ordered list that can be used to store address information on the storage device. In some embodiments, the buffer may contain other information used to retrieve addresses on the storage device.

At block 830, according to embodiments, data may be loaded to the memory media from the storage media based on the memory address information. For example, if the buffer contains a memory address, that memory address may be used to load data from the storage media to the memory media. In some embodiments, the buffer may contain other information used to determine address information on the storage media. For example, the buffer may contain an address range.

In some embodiments, an arbiter may determine whether to retrieve address information from the prefetcher or process another read/write request. In some embodiments, the address information from the buffer may be in the same format as a request from a host. In some embodiments, the arbiter may know whether the request coming to the arbiter is from a host or from the prefetcher, and format the request in an appropriate format for the storage device to process the request. In some embodiments, the arbiter may use any load balancing scheme to determine an order for the requests from the host and the address information from the prefetcher. In some embodiments, the arbiter may use AI to determine an order of the requests. In some embodiments, the arbiter may receive a request as a submission queue entry (SQE). In some embodiments, the arbiter may forward the message from the prefetcher, and a controller on the storage device may process the address information to obtain addresses on the storage media. In some embodiments, the storage device may determine that the data is already loaded to the memory media and process a next request. In some embodiments, address information may be passed to the arbiter, and the arbiter may create a request to load data to the queue. In some embodiments, any of the components of the storage device may create the request to load data. For example, the cache may receive the address information and logic for the cache may allow it to load data to the cache. In some embodiments, no programmatic changes may be needed on the host and the requests from the arbiter may have the appropriate format for the cache to load data.

At block 840, according to embodiments, the host may request data from the storage device corresponding to the address information allowing the host to retrieve the data from the cache (e.g., a cache hit) (at block 850), whereby IOPS may be increased. In some embodiments, if the data is not in the cache, the data may be loaded to the cache and then retrieved by the host. In some embodiments, if the data is not in the cache, the data may be directly retrieved from the storage media. In some embodiments, the storage device may also determine whether the address in the prefetcher is in use (e.g., whether the data will still be used by the host). In some embodiments, if the data is not needed by the host, the prefetcher may not pass the address information to the arbiter. In some embodiments, the arbiter may determine if the data should be loaded to the cache. For example, if the data is already in the cache or no longer needed, the arbiter may not pass the request to the cache and instead handle a next request.

In some embodiments, memory media may be accessed by software using load and/or store instructions, whereas storage media may be accessed by software using read and/or write instructions.

In some embodiments, memory media may be accessed using a memory interface and/or protocol such as double data rate (DDR) of any generation (e.g., DDR4, DDR5, etc.), direct memory access (DMA), remote DMA (RDMA), Open Memory Interface (OMI), Compute Express Link (CXL). Gen-Z, and/or the like, whereas storage media may be accessed using a storage interface and/or protocol such as serial ATA (SATA), Small Computer System Interface (SCSI), serial attached SCSI (SAS), NVMe, NVMe-oF, and/or the like.

Although some embodiments may be described in the context of memory media that may be implemented with memory media such as DRAM, in other embodiments, other types of media, e.g., storage media, may be used for memory media. For example, in some embodiments, some or all of the memory media 260 may be implemented with media other than memory media that may have one or more relative characteristics (e.g., relative to the storage media 270) that may make one or both of them more suitable for their respective functions. For instance, in some embodiments, the storage media 270 may have a relatively higher capacity, lower cost, and/or the like, whereas some or all of the memory media 260 may have relatively lower access latency that may make it relatively more suitable for use as a cache.

Storage device 250 as well as any other devices disclosed herein may be used in connection with one or more personal computers, smart phones, tablet computers, servers, server chassis, server racks, datarooms, datacenters, edge datacenters, mobile edge datacenters, and/or any combinations thereof.

Any of the functionality described herein, including any of the user functionality, device functionally, and/or the like (e.g., any of the control logic) may be implemented with hardware, software, firmware, or any combination thereof including, for example, hardware and/or software combinational logic, sequential logic, timers, counters, registers, state machines, volatile memories such as DRAM and/or SRAM, nonvolatile memory including flash memory, persistent memory such as cross-gridded nonvolatile memory, memory with bulk resistance change, PCM, and/or the like and/or any combination thereof, complex programmable logic devices (CPLDs), FPGAs, ASICs, central processing units (CPUs) including CISC processors such as x86 processors and/or RISC processors such as ARM processors, graphics processing units (GPUs), neural processing units (NPUs), tensor processing units (TPUs), data processing units (DPUs), and/or the like, executing instructions stored in any type of memory. In some embodiments, one or more components may be implemented as a system on a chip (SoC).

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner. The various details and embodiments described above may be combined to produce additional embodiments according to the inventive principles of this patent disclosure.

In some embodiments, a portion of an element may refer to less than, or all of, the element. A first portion of an element and a second portion of the element may refer to the same portions of the element. A first portion of an element and a second portion of the element may overlap (e.g., a portion of the first portion may be the same as a portion of the second portion).

While certain exemplary embodiments have been described and shown in the accompanying drawings, it should be understood that such embodiments merely illustrative, and the scope of this disclosure is not limited to the embodiments described or illustrated herein. The invention may be modified in arrangement and detail without departing from the inventive concepts, and such changes and modifications are considered to fall within the scope of the following claims.

The invention claimed is:

1. A device comprising:
memory media configured as a cache;
storage media;
a buffer; and
at least one circuit configured to perform one or more operations comprising:
  receiving memory address information corresponding to data to be loaded to the cache;
  parsing one or more addresses from the memory address information;
  storing the one or more addresses in the buffer;
  determining an availability of the device to load data to the memory media; and
  loading the data to the memory media, from the storage media, corresponding to the one or more addresses in the buffer.

2. The device of claim 1, wherein the memory address information is first memory address information;
wherein the data is first data; and
wherein the at least one circuit is further configured to perform one or more operations comprising:
  receiving a memory access request comprising second memory address information;
  determining to load second data from the storage media based on a priority of the memory access request; and
  loading the second data to the memory media, from the storage media, corresponding to the second memory address information.

3. The device of claim 1, wherein loading the data comprises:
obtaining at least one address from the memory address information; and
adding the at least one address to the buffer.

4. The device of claim 1, wherein the memory address information comprises an indication of a length of addresses and at least one address.

5. The device of claim 1, wherein the memory address information comprises at least one address and an indication of a number of addresses.

6. The device of claim 1, wherein the at least one circuit is further configured to perform one or more operations comprising:
receiving an instruction to make the buffer available; and
making the buffer available.

7. The device of claim 1, wherein the at least one circuit is further configured to perform one or more operations comprising:

receiving an instruction to make the memory media available; and making the memory media available.

8. The device of claim 1, wherein the at least one circuit comprises a control register configured to perform one or more operations comprising:

determining, based on the control register, a status of the buffer; and modifying, based on the status, operations of the at least one circuit.

9. A method comprising:

receiving memory address information corresponding to data to be loaded to a cache;

parsing one or more addresses from the memory address information;

storing the one or more addresses in a buffer;

determining an availability to load data to memory media; and loading the data to the memory media, from storage media, based on the memory address information in the buffer.

10. The method of claim 9, wherein the memory address information is first memory address information;

wherein the data is first data; and wherein the method further comprises:

receiving a memory access request comprising second memory address information;

determining to load second data from the storage media based on a priority of the memory access request; and loading the second data to the memory media, from the storage media, based on the second memory address information.

11. The method of claim 9, wherein loading the data comprises:

obtaining at least one address from the memory address information; and adding the at least one address to the buffer.

12. The method of claim 9, wherein the memory address information comprises an indication of a length of addresses and at least one address.

13. The method of claim 9, wherein the memory address information comprises at least one address and an indication of a number of addresses.

14. The method of claim 9, further comprising:

receiving a request to make the buffer available; and making the buffer available.

15. The method of claim 9, further comprising:

determining a status of the buffer; and modifying, based on the status, operations on the buffer.

16. A system comprising:

a host device comprising an application and a thread, wherein the thread comprises memory address information corresponding to data to be loaded to a cache for the application; and a storage device comprising:

memory media configured as the cache;

storage media;

a buffer; and at least one circuit configured to perform one or more operations comprising:

receiving the memory address information;

parsing one or more addresses from the memory address information;

storing the memory address information in the buffer;

determining an availability of the storage device to load data to the memory media; and loading the data to the memory media, from the storage media, based on the one or more addresses in the buffer.

17. The system of claim 16, wherein the at least one circuit is further configured to perform one or more operations comprising:

receiving a memory access request comprising second memory address information;

determining to load second data based on the memory access request; and loading the second data to the memory media, from the storage media, based on the second memory address information.

18. The system of claim 16, wherein the memory address information comprises an indication of a length of addresses and at least one address.

19. The system of claim 16, wherein the memory address information comprises at least one address and an indication of a number of addresses.

20. The system of claim 16, wherein the at least one circuit is further configured to perform one or more operations comprising:

receiving an instruction to make the buffer available; and making the buffer available.

\* \* \* \* \*